US008888166B2

(12) United States Patent
Cassaday et al.

(10) Patent No.: US 8,888,166 B2
(45) Date of Patent: Nov. 18, 2014

(54) LOAD TRANSFER DEVICE

(71) Applicant: International Truck Intellectual Property Company, LLC, Lisle, IL (US)

(72) Inventors: Nicholas Michael Cassaday, Oswego, IL (US); Daniel S Russell, Howell, MI (US)

(73) Assignee: Navistar Defense Engineering, LLC, Lisle, IL (US)

( * ) Notice: Subject to any disclaimer, the term of this patent is extended or adjusted under 35 U.S.C. 154(b) by 13 days.

(21) Appl. No.: 13/848,417

(22) Filed: Mar. 21, 2013

(65) Prior Publication Data
US 2013/0249244 A1 Sep. 26, 2013

Related U.S. Application Data

(60) Provisional application No. 61/615,679, filed on Mar. 26, 2012.

(51) Int. Cl.
*B62D 25/20* (2006.01)
*F41H 7/02* (2006.01)
*F41H 5/013* (2006.01)
*F41H 7/04* (2006.01)
*B62D 35/00* (2006.01)

(52) U.S. Cl.
CPC ............... *B62D 25/20* (2013.01); *F41H 7/042* (2013.01); *B62D 35/001* (2013.01); *B62D 25/2036* (2013.01)
USPC .................. 296/187.08; 296/187.09; 89/36.08

(58) Field of Classification Search
CPC ........ B62D 21/11; B62D 25/20; B60R 21/12; F41H 7/0004; F41H 7/042; F41H 7/0204; F41H 5/013; B60P 7/16
USPC ............. 296/187.03, 187.07, 187.08, 193.07, 296/204, 29, 30; 89/36.08, 36.07, 36.01, 89/36.02, 36.09
See application file for complete search history.

(56) References Cited

U.S. PATENT DOCUMENTS 7,712,823 B2 * 5/2010 Greuter et al. ........... 296/187.07
7,954,419 B2 * 6/2011 Ran et al. ..................... 89/36.08
(Continued)

FOREIGN PATENT DOCUMENTS

EP 2325595 A2 5/2011
EP 2413089 A2 7/2011
WO 2011/139307 A2 11/2011

OTHER PUBLICATIONS

Combined Search and Examination Report from corresponding GB application in the same family.

*Primary Examiner* — Gregory Blankenship
(74) *Attorney, Agent, or Firm* — Jeffrey P. Calfa; Mark C. Bach

(57) ABSTRACT

A load transfer system and device for use in connection with structures forming a personnel cabin for a vehicle, is disclosed. The load transfer system includes a first surface, a second surface joined in an overlapping configuration with the first surface at a plurality of connection points, and, a load transfer device, wherein a force impacted on the first surface transfers via the load transfer device away from the connection points to prevent shearing of the connection points from the surfaces. The system and device are particularly useful on military vehicles, which are frequently subjected to high impact activities, including shock waves from a mine blast or impact between two objects, such as a vehicle crash. These events can subject the structures forming the vehicles and cabins to large shear stresses, particularly on the connection points holding the structures together, which could cause the connections to fail.

7 Claims, 9 Drawing Sheets

(56) References Cited

U.S. PATENT DOCUMENTS

| | | | |
|---|---|---|---|
| 8,033,208 B2 * | 10/2011 | Joynt et al. | 89/36.08 |
| 8,146,478 B2 * | 4/2012 | Joynt et al. | 89/36.08 |
| 8,418,594 B1 * | 4/2013 | Dunne et al. | 89/36.02 |
| 8,640,594 B2 * | 2/2014 | Treadway et al. | 89/36.08 |
| 2002/0145308 A1 * | 10/2002 | Honlinger | 296/193 |
| 2009/0140545 A1 * | 6/2009 | Greuter et al. | 296/187.07 |
| 2009/0250969 A1 * | 10/2009 | Wani et al. | 296/187.03 |
| 2009/0272254 A1 * | 11/2009 | Hunn et al. | 89/36.02 |
| 2010/0013268 A1 * | 1/2010 | Roccato et al. | 296/187.08 |
| 2010/0078966 A1 * | 4/2010 | Onoda et al. | 296/193.07 |
| 2010/0207426 A1 * | 8/2010 | Tsuruta et al. | 296/187.12 |
| 2010/0219663 A1 * | 9/2010 | Levin et al. | 296/204 |
| 2011/0017504 A1 * | 1/2011 | Hardin et al. | 174/267 |
| 2012/0049570 A1 * | 3/2012 | Aizik | 296/187.08 |
| 2012/0086238 A1 * | 4/2012 | Tan | 296/209 |
| 2013/0249244 A1 * | 9/2013 | Cassaday et al. | 296/187.08 |
| 2014/0026741 A1 * | 1/2014 | Dunne et al. | 89/36.02 |
| 2014/0060304 A1 * | 3/2014 | Harmon et al. | 89/36.02 |
| 2014/0062130 A1 * | 3/2014 | Yoshimura et al. | 296/187.08 |
| 2014/0150633 A1 * | 6/2014 | Mears et al. | 89/36.02 |

* cited by examiner

LOAD TRANSFER DEVICE

CROSS-REFERENCE TO RELATED APPLICATIONS

This application claims the benefit of U.S. Provisional Patent Application Ser. No. 61/615,679 filed on Mar. 26, 2012.

TECHNICAL FIELD

The present system and device relates to the transfer of loading forces away from the structures forming a vehicle. More specifically, the system and device relates to the transfer or dissipation of loading forces, resulting from a blast or other impacting event, away from potentially shearing the connecting point or bolts hold the structures together that form the personnel cabin of a vehicle.

BACKGROUND

In conflict situations, military vehicles and their personnel cabins are frequently the subject of high impact activities, including shock waves from a mine blast or impact between two objects, such as a vehicle crash. These events can subject the structures forming the vehicles and cabins, and the connection points or bolt connects holding these structures together to large sheer stresses, which could cause the connections to fail. For example, high impact blasts can apply large shear stresses to the bolted connections holding the walls and flooring together to create the personnel cabin of the vehicle, resulting in damage or destruction of the personnel cabin. Additionally, impact to the vehicle, in the form of collisions with another vehicle or an object, may also cause the connections to fail.

Current solutions that attempt to avoid structural failure in the event of a high impact activity, events is to add more bolts or even larger bolts to the connection points securing the structures together. However, failure of even a few of the bolted connections may result in a weakened overall structure, and leave the structure vulnerable to additional damage or destruction before repairs can be made. Alternatively, the bolted connections can be replaced by a welded joint connection, which eliminates the ability to repair or service the components, but allows for the panels to be secured together.

Therefore, there is a need for a system and device that transfers the loading forces resulting from a high impact event away from the connection points securing the cabin structures together. The present device provides components engage one another for attaching surfaces or structures together to form the personnel cabin, using the same number or possibly fewer numbers of bolts or connection members to secure the structures, while permitting improved loading force transfer or diversion away from the structural connection points. The loading forces are taken off the connection bolts and transferred through high strength material, dispersing the load between the structures. The present system and device also permits personnel to mechanically attach a separate blast solution component or components to the vehicle only when required, thereby reducing the weight of the overall attachment mechanism.

SUMMARY

There is disclosed herein an improved system and device for the transfer of high impact loading forces away from joints and connection points of vehicle cabin structures.

In an embodiment of the present load transfer system for use in a personnel cabin for a vehicle, the system includes an outer base wall forming a bottom surface of the cabin, at least one side wall connected to the base wall in an overlapping configuration at a plurality of connection points, the side wall and base wall forming an interior space of the cabin, and, a load transfer device disposed within the base wall, wherein upon impact of the base wall the load transfer device diverts loading forces away from the connection points.

In an embodiment of the load transfer system, the load transfer device comprises at least one comb component, which diverts loading forces generated upon impact to one of the base and sidewalls of the personnel cabin and away from the connection points.

In yet another embodiment of the load transfer system, the system further includes a second comb component disposed perpendicular to the edge of the outer base wall of the cabin and engages the first comb component.

In yet another embodiment of the load transfer system, the system further includes a third comb component disposed perpendicular at an inner edge of the base wall. The third comb component is secured to the inner edge of the base wall through a wedge A load transfer device for absorbing and transferring loading forces generated to overlapping surfaces forming a vehicle cabin is disclosed. The device comprises a first comb structure disposed within a surface of the cabin and a second comb structure, wherein the first comb structure engages the second comb structure to divert loading forces away from connection points securing the overlapping surfaces and permitting the surfaces to move together upon receiving the loading forces to at least one surface.

A load transfer system for use in connection with structures forming a personnel cabin for a vehicle, is disclosed. The load transfer system includes a first surface, a second surface joined in an overlapping configuration with the first surface at a plurality of connection points, and, a load transfer device, wherein a force impacted on the first surface transfers via the load transfer device away from the connection points to prevent shearing of the connection points from the surfaces.

In an embodiment of the load transfer system, the device includes a first comb structure and a locking structure.

In yet another embodiment of the load transfer system, the locking structure is one of a second comb or a wedge.

These and other features and advantages of the present load transfer system and device can be more readily understood from the following detailed discussion with reference to the appended drawing figures.

DETAILED DESCRIPTION

FIGS. 1-9 illustrate embodiments of a load transfer system and device, generally designated by the numerals 100 and 200, as well as components thereof. The device is designed for use in connection with the structures and surfaces comprising an underbelly or floor structure and side walls of the personnel cabin 10 of a vehicle (not shown), particularly a military vehicle, which is used in war zones for transporting personnel and cargo. These vehicles are often subject high impact activities, including shock waves from a mine blast, an impact between two objects such as a vehicle crash, etc., which can subject the structures and their connection points or bolt connections to large sheer stresses, which could cause the connections to fail.

Figure 1:
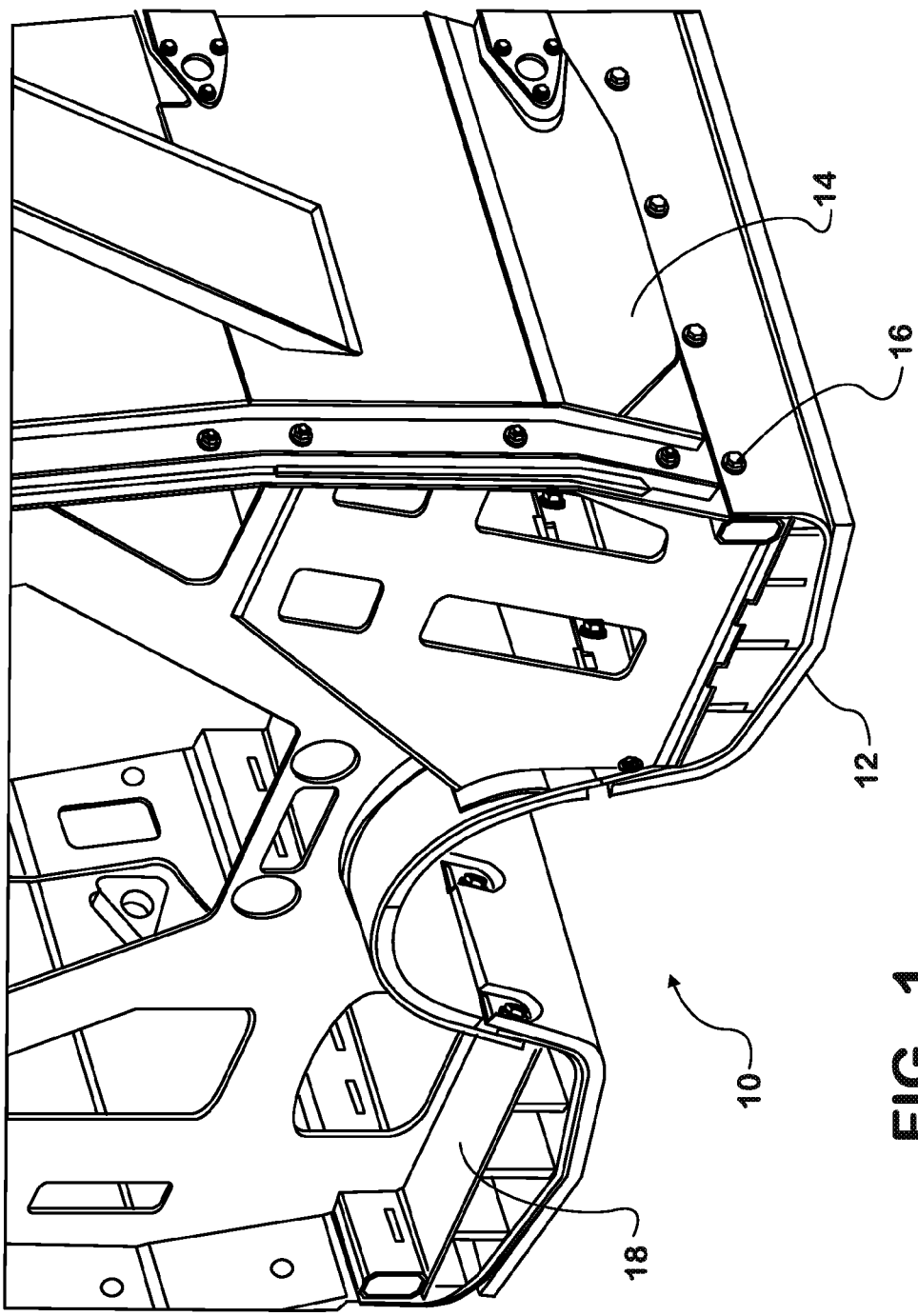
FIG. 1 is a perspective view of a bottom portion of a cabin for a personnel vehicle using the load transfer system and device of the present disclosure.

Generally, personnel cabins of military vehicles are constructed from several wall structures or surfaces, which are connected together through a plurality of connection bolts, or other securing components, to create the cabin. The wall structures are typically constructed from high strength steel or composite materials, which are light weight, yet blast resistant. For example, FIG. 1 illustrates a cut away perspective view of a personnel cabin, while FIG. 2 illustrates one side view of the bottom portion of the cabin, incorporating the load transfer system of the present disclosure.

The cabin 10 and its interior compartment is generally constructed from several structures, including an outer base wall or surface 12, which forms a bottom of the cabin, and at least one side wall or surface 14, for example, an outer surface wall, and 15 an inner surface wall. The side wall or surface 14, 15 is connected to an outer edge of the base wall 12, at a plurality of connection points 16. The interior of the cabin 10 is formed by side walls 14, which are connected to the base wall through the plurality of connection points 16. Finally, there is a floor 18 within the interior space of the cabin. The floor 18 includes a sub-floor layer 18a and a top floor surface 18b, which is in contact with the feet of the occupants, or is a storage surface for cargo. It should be understood that this is a general description of the structures comprising the cabin. The cabin 10 may include additional structures, such as blast protection panels and other structures that will not be described in further detail. Additionally, while embodiments of the load transfer system and device as described in relation to a particular structure or surface of the cabin, it should be understood that the device may be located in conjunction with different structures and areas of the cabin.

Figure 2:
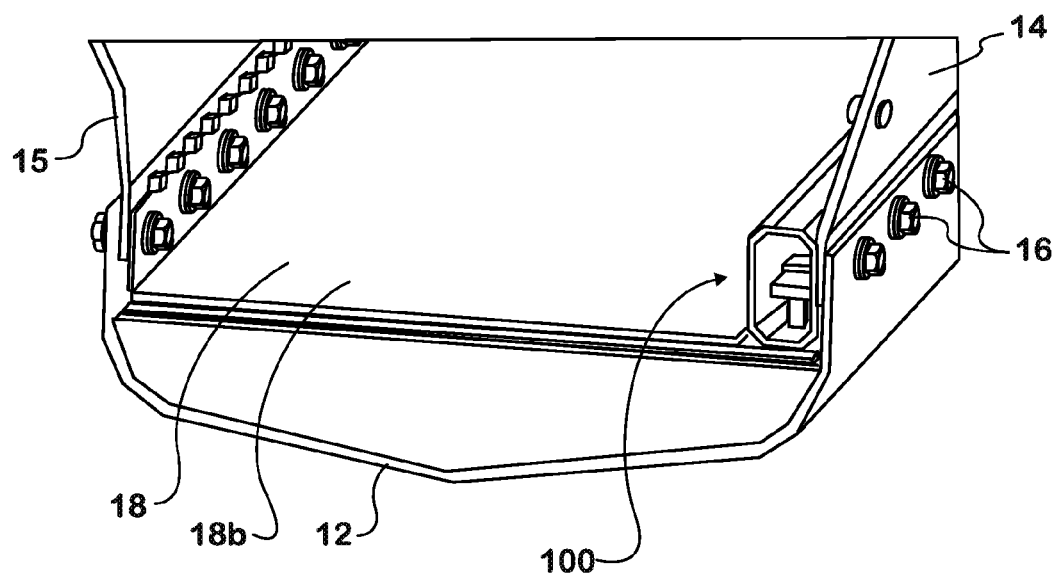
FIG. 2 is a perspective view of the one side of the bottom portion of a cabin with the load transfer system and device assembled therein.

As shown in FIG. 2, the structures 12, 14, 15, 18 are secured together through a plurality of contact or connection points 16, using standard fasteners such as bolts, which are even spaced apart from one another. The number of bolts 16 used to connect the structures can vary considerably depending on the structural requirements, size and weight of the vehicle. However, regardless of the number of bolts used, high impact activities, including shock waves from a blast or the impact of objects to the vehicle, can create stresses to the structures and to the bolts, causing them to shear and fail. Attempts to counteract any failure of the connections include the use of larger bolts, or increasing the number of bolts; however this may undesirably increase the weight of the vehicle or be impractical for use on the field.

Figure 3:
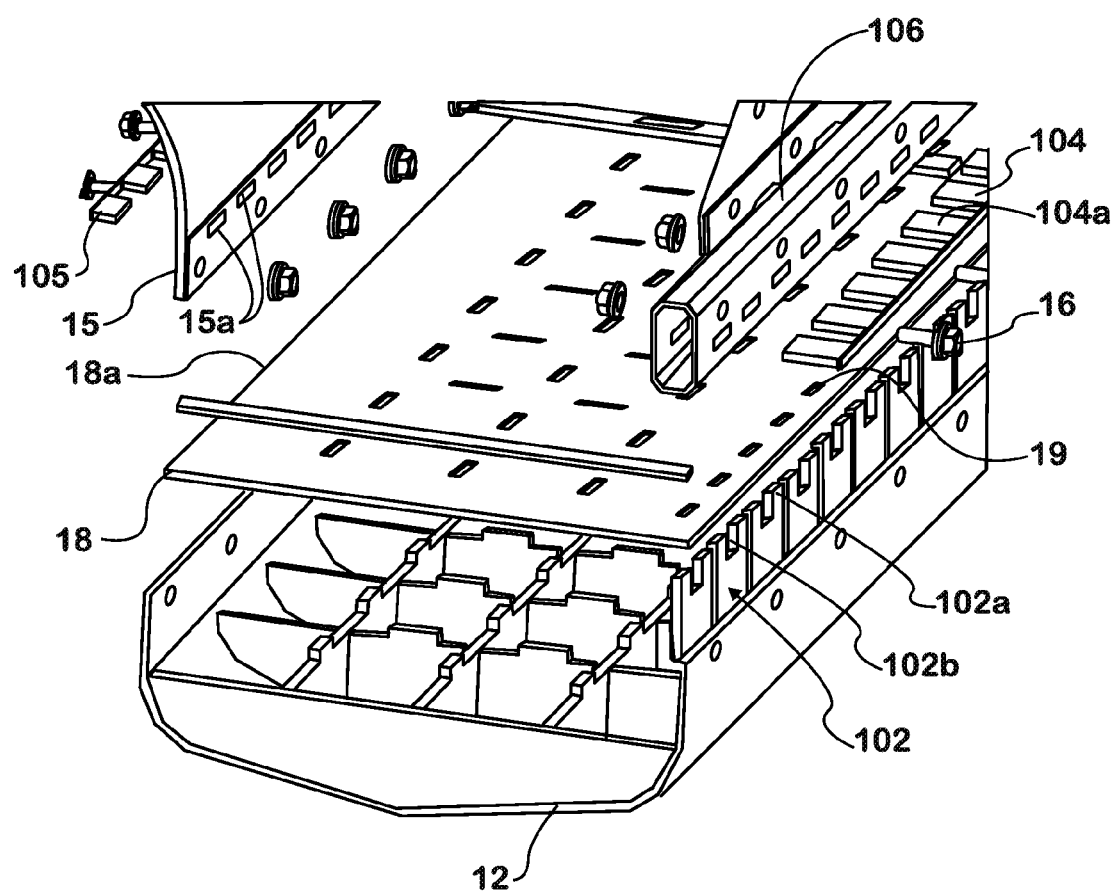
FIG. 3 is an exploded view of the load transfer device of the present disclosure.

Incorporating a load transfer system and device 100, to divert some of the loading forces away from the connection points, would alleviate bolt shear and failure during high impact activities. FIGS. 3-9 illustrate embodiments of the load transfer device 100, 200 of the present disclosure. In an initial embodiment, shown in FIGS. 3-5, the load transfer device 100 comprises at least one comb structure or first comb structure 102 having a plurality of teeth 102a and openings 102b between each of the teeth. As shown in FIG. 3, the first comb structure 102 is positioned within a lower outer edge of the bottom surface 12 of the cabin 10. The teeth 102a of the comb structure 102 pass through the floor 18, and in particular, through openings 19 in the sub-floor layer 18a of the floor 18.

The device 100 further includes a second comb structure 104, also having a plurality of teeth 104a. The second comb structure 104 is positioned perpendicular to the first comb structure 102. The teeth 104a of the second comb structure engage the openings 102b between the teeth 102a of the first comb structure when the combs are located within the bottom surface. The coupled comb structures 102, 104 sit below the bolts 16 securing the bottom surface 12 to the side surfaces 14. Optionally, only one comb structure is used, for example, on a surface forming an interior wall 15 of the structure. FIG. 3 shows the single comb 105, which passes through openings 15a in the interior side wall 15.

Figure 4:
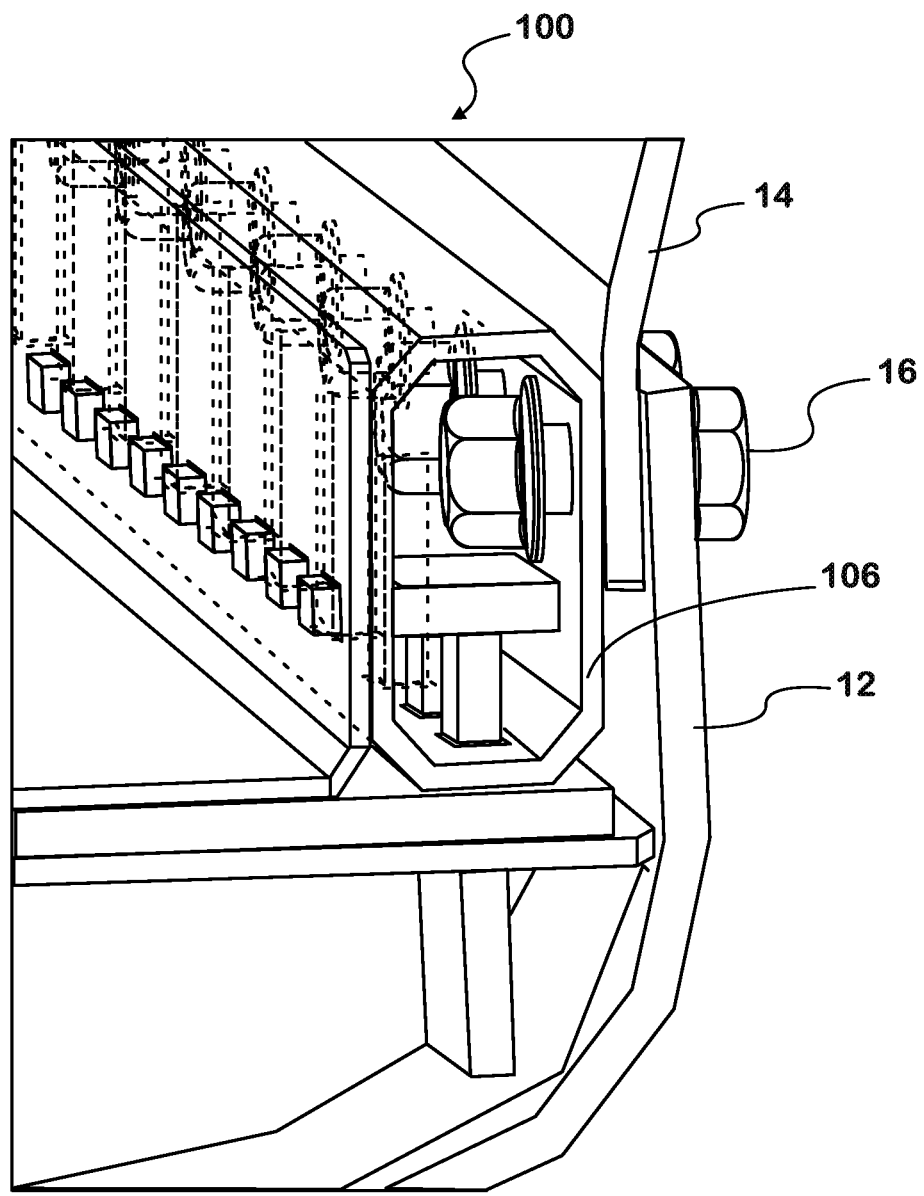
FIG. 4 is close-up view of the load transfer device.
Figure 5:
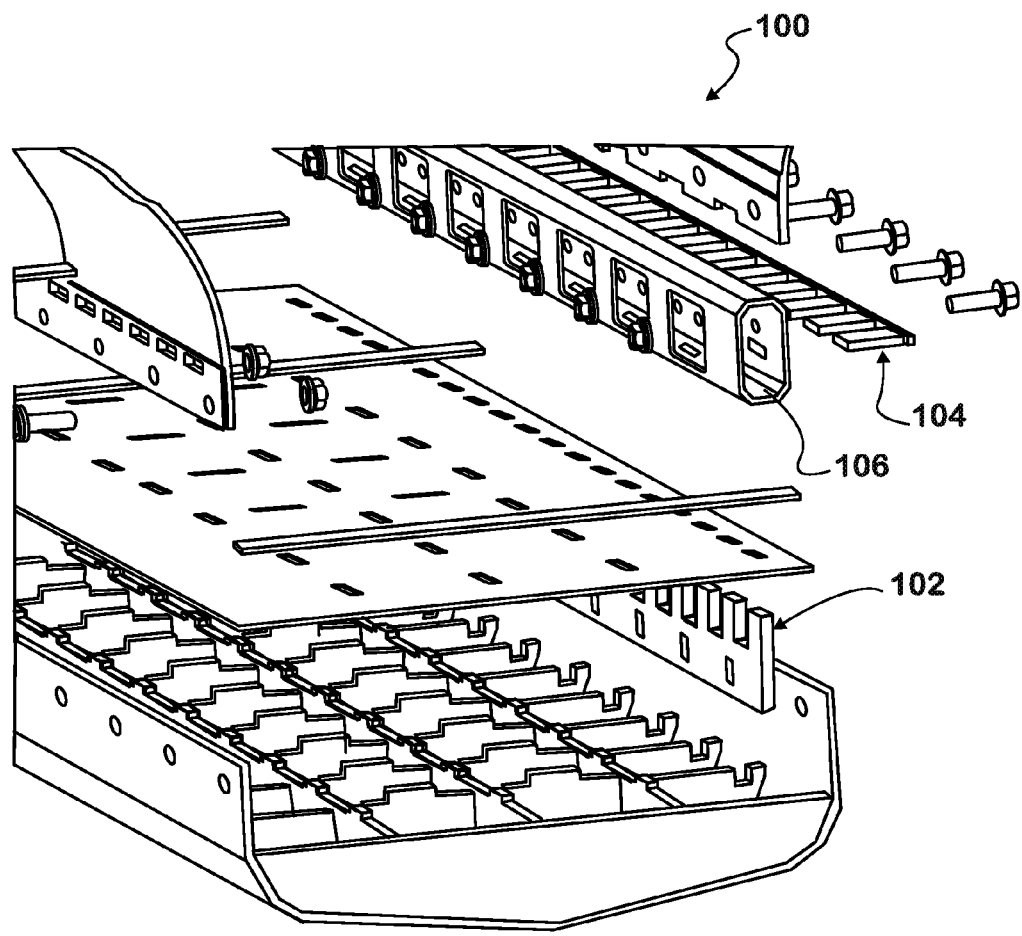
FIG. 5 is another exploded view of the load transfer device of the present disclosure.
Figure 6:
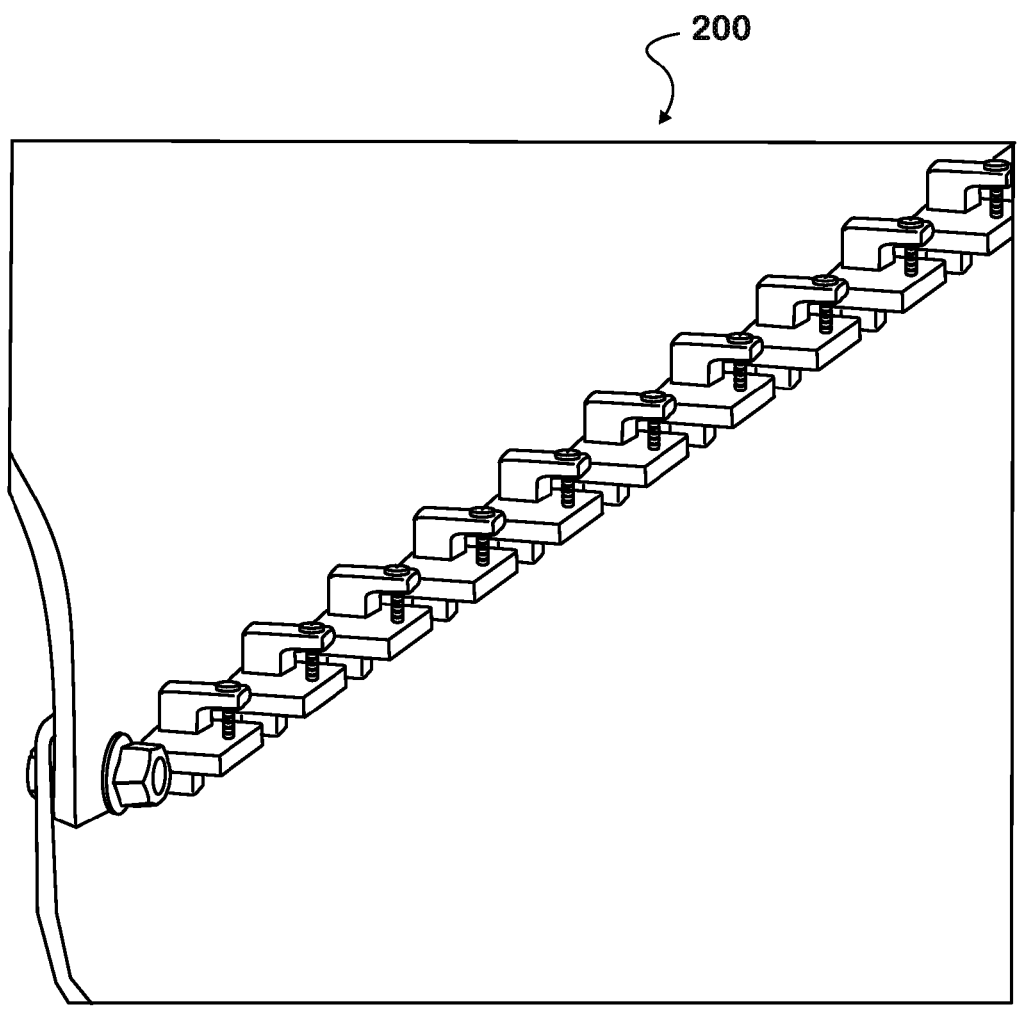
FIG. 6 is another embodiment the load transfer system and device.
Figure 7:
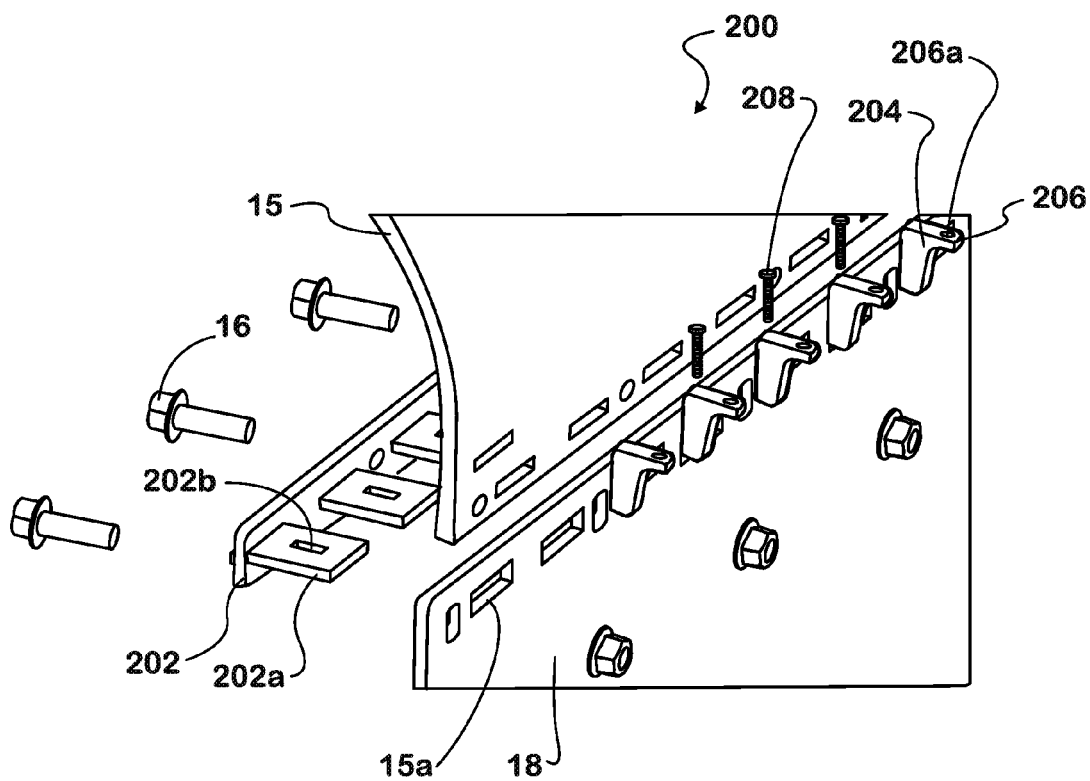
FIG. 7 is an exploded view of the load transfer device of FIG. 6.
Figure 8:
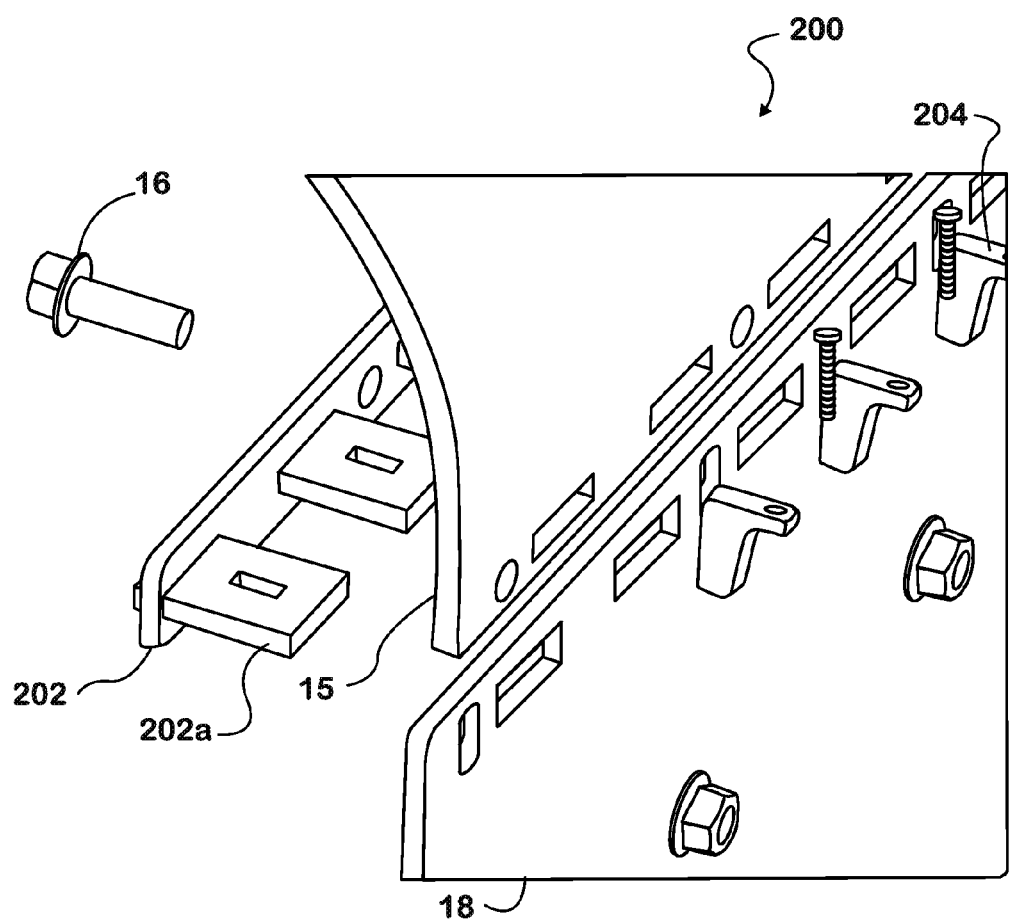
FIG. 8 is a close-up view of the load transfer device of FIG. 6.
Figure 9:
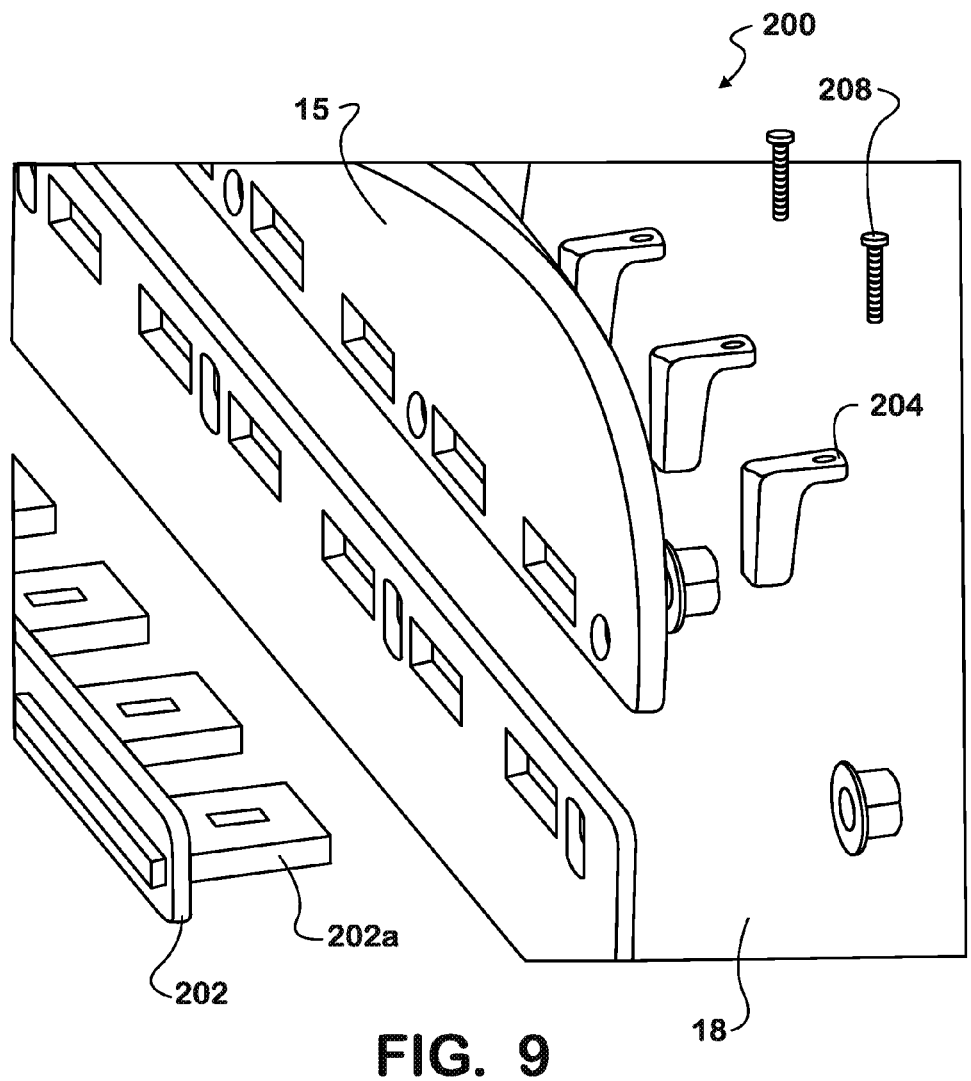
FIG. 9 is another exploded view of the load transfer device of FIG. 6.

As shown is FIG. 4, the combined comb structures of the device are located within a housing 106. The housing 106 is secured to one of the side walls or surfaces 14 by the bolts 16, which likewise secure the overlapping sections of the base wall 12 and side wall 14 (FIG. 4). The device 100 sits below the bolts 16, thereby providing the absorption or transfer of the loading force energy away from the bolts.

The device 100 and its housing 106 provide an additional means of securing the cabin structures 12, 14, 18. This added security provides not only additional strength to the overall structure but also permits the base wall or surface 12 and side wall or surface 14 to move in unison upon impact from a blast or other force. Without the device 100, the base wall 12, for example, may slide up and away from the side wall 14 upon receiving an impact. Thus, rather than moving as separate surfaces, the load transfer device 100 enables the two surfaces to move together rather than separately from one another. It is the separation and sliding motion of the surfaces 12, 14 that causes the shearing of the connection bolts 16. Use of the present load transfer device 100 is designed to avoid the shearing effect.

FIGS. 6-9 illustrate another embodiment of the load transfer device 200. In this embodiment, the device 200 includes a comb structure 202 having wide teeth 202a with a receiving opening 202b through the middle of each tooth. The teeth 202a of the comb structure 202 pass through openings 15a in the side wall 15, which then connects the side wall to the floor 18. The device 200 further includes a locking structure 204, which engages the opening 202b of the comb structure 200. Although the figures illustrate the locking structure as a wedge, it should be understood that the locking structure can have any suitable shape for engagement with the opening the comb structure.

In the embodiment shown in FIGS. 6-9, the wedge 204 includes a top projecting portion 206 having an opening 206a for receiving a fastener 208, such as a screw. When the wedge 204 is engaged with the comb structure 200, the fastener 208 secures the top projecting portion 206 to the comb structure 200. The wedge 204 provides lateral stability, and retains the comb structure 200 in position during operation. As with the prior embodiment, the device 200 is located in the overlapping section of the surfaces forming the floor 18 and the side wall 15 of the cabin. Optionally, the comb structure may be used without the wedge, and may be secured to the surfaces using the fastener alone.

It should be understood, that regardless of the embodiment of load transfer device used, the number of comb structures and wedges may vary. The devices 100, 200 are typically constructed of a high strength metal, but may also be constructed from high strength polymers, composites or a combination of any of these materials. Regardless of the material used, the comb structures should be strong to withstand the impact or shock wave forces, yet light enough to not add additional weight to the structures.

What is claimed is:

1. A load transfer system for use in connection with structures forming an underbelly of a personnel cabin for a vehicle, the load transfer system comprising:

an outer base wall forming a bottom surface of the personnel cabin;

at least one side wall connected to the outer base wall in an overlapping configuration at a plurality of connection points, the at least one side wall and outer base wall forming an interior space of the personnel cabin; and a load transfer device disposed within the outer base wall, wherein the load transfer device comprises:

at least a first comb structure disposed vertically within the outer base wall; and a second comb structure disposed perpendicular to and engages the first comb structure wherein a force impacting on the outer base wall is diverted away from the plurality of connection points by the load transfer device.

2. The load transfer system of claim 1, wherein the plurality of connection points include a plurality of bolts.

3. The load transfer system of claim 1, wherein the load transfer device permits the outer base wall and the at least one side wall to move together when the force impacts the outer base wall and prevents shearing of the plurality of connection points.

4. A load transfer device for absorbing and transferring loading forces generated by high impact activities to overlapping surfaces forming a vehicle cabin, the load transfer device comprising:

a first comb structure disposed within a surface of the vehicle cabin; and a second comb structure for engaging with the first comb structure, wherein the first comb structure and the second comb structures combined to divert the loading forces away from connection points securing the overlapping surfaces while permitting the overlapping surfaces to move together when the loading forces impact at least one of the overlapping surfaces.

5. The load transfer device of claim 4, wherein the first comb structure and the second comb structure are engaged below the connection points.

6. A load transfer system for use in connection with structures forming a personnel cabin for a vehicle, the load transfer system comprising:

a first surface;

a second surface joined in an overlapping configuration with the first surface at a plurality of contact points; and a load transfer device, wherein a force impacted on the first surface transfers via the load transfer device away from the plurality of contact points to prevent shearing of the plurality of contact points from the first surface and the second surface, wherein the load transfer device comprises a first comb structure and a locking structure, wherein the first comb structure and the locking structure interconnect with one another permitting the first surface and the second surface to move together when the force impacts at least one of the first surface and the second surface.

7. The load transfer system of claim 6, wherein the locking structure is one of a second comb structure and a wedge.

\* \* \* \* \*